United States Patent
Clarke et al.

(10) Patent No.: US 9,575,810 B2
(45) Date of Patent: Feb. 21, 2017

(54) LOAD BALANCING USING IMPROVED COMPONENT CAPACITY ESTIMATION

(71) Applicants: Allan D. Clarke, Austin, TX (US); Douglas M. Neuse, Austin, TX (US)

(72) Inventors: Allan D. Clarke, Austin, TX (US); Douglas M. Neuse, Austin, TX (US)

(73) Assignee: CA, Inc., New York, NY (US)

(*) Notice: Subject to any disclaimer, the term of this patent is extended or adjusted under 35 U.S.C. 154(b) by 0 days.

(21) Appl. No.: 14/609,557

(22) Filed: Jan. 30, 2015

(65) Prior Publication Data
US 2016/0224392 A1   Aug. 4, 2016

(51) Int. Cl.
G06F 9/46     (2006.01)
G06F 15/173   (2006.01)
G06F 9/50     (2006.01)

(52) U.S. Cl.
CPC .................. G06F 9/5083 (2013.01)

(58) Field of Classification Search
None
See application file for complete search history.

(56) References Cited

U.S. PATENT DOCUMENTS

| | | | |
|---|---|---|---|
| 2009/0172693 A1* | 7/2009 | Corum | G06F 9/505 718/105 |
| 2011/0225594 A1* | 9/2011 | Iyengar | G06F 9/46 718/105 |
| 2014/0019964 A1* | 1/2014 | Neuse | G06F 9/45533 718/1 |

* cited by examiner

Primary Examiner — Bing Zhao
(74) Attorney, Agent, or Firm — Baker Botts L.L.P.

(57) ABSTRACT

A method includes receiving, at a load balancer for a plurality of computing components, a workload request. The method also includes accessing a database including a respective non-linear scalability model for each of the plurality of computing components. The method further includes determining a particular computing component from the plurality of computing components based on each respective non-linear scalability model; and scheduling the workload request for execution by the particular computing component.

19 Claims, 7 Drawing Sheets

| ADMINISTRATION | RESOURCE SCORE | VPM | | |
|---|---|---|---|---|
| SYSTEM HEALTH | COMPUTER LIBRARY | DATA SOURCES | SERVER CONFIGURATION | |

FILTER BY COMPUTER MODEL [x]

| PREFERRED | COMPUTER MODEL | CPU RESOURCE SCORE | DESCRIPTION |
|---|---|---|---|
| ☑ | CISCO UCS B230 M1 2266 MHz Xeon X7560 | 406.9 | INTEL Xeon X7560, 8 CORES/CHIP (2266 MHz,8x256 KB L2, 24 MB L3 |
| ☑ | CISCO UCS B230 M1 2267 MHz Xeon E5520 | 192.1 | INTEL Xeon X7560, 8 CORES/CHIP (2266 MHz,8x256 KB L2, 24 MB L3 |
| ☑ | CISCO UCS B230 M1 2267 MHz Xeon L5520 | 191.9 | INTEL Xeon X7560, 8 CORES/CHIP (2266 MHz,8x256 KB L2, 24 MB L3 |
| ☑ | CISCO UCS B230 M1 2533 MHz Xeon E5540 | 206.2 | INTEL Xeon X7560, 8 CORES/CHIP (2266 MHz,8x256 KB L2, 24 MB L3 |
| ☑ | CISCO UCS B230 M1 2267 MHz Xeon X5550 | 232.3 | INTEL Xeon X7560, 8 CORES/CHIP (2266 MHz,8x256 KB L2, 24 MB L3 |
| ☑ | CISCO UCS B230 M1 2266 MHz Xeon X7560 | 245.7 | INTEL Xeon X7560, 8 CORES/CHIP (2266 MHz,8x256 KB L2, 24 MB L3 |
| ☑ | CISCO UCS B230 M1 2933 MHz Xeon X5570 | 667.6 | INTEL Xeon X7560, 8 CORES/CHIP (2266 MHz,8x256 KB L2, 24 MB L3 |
| ☑ | CISCO UCS B230 M1 1867 MHz Xeon L7555 | 537.4 | INTEL Xeon X7560, 8 CORES/CHIP (2266 MHz,8x256 KB L2, 24 MB L3 |
| ☑ | DELL POWEREDGE 2650 2400 MHz | 11.9 | |
| ☑ | DELL POWEREDGE 2650 2400 MHz | 126.1 | INTEL Xeon X7560, 8 CORES/CHIP (2266 MHz,8x256 KB L2, 24 MB L3 |
| ☑ | DELL POWEREDGE 2900 III 2500 MHz XEON E5420 | 195.4 | INTEL Xeon X7560, 8 CORES/CHIP (2266 MHz,8x256 KB L2, 24 MB L3 |
| ☑ | DELL POWEREDGE R900 2400 MHz XEON E7340 | 138.2 | INTEL Xeon X7560, 8 CORES/CHIP (2266 MHz,8x256 KB L2, 24 MB L3 |
| ☑ | DELL PRECISION R5400 3000MHz XEON E5450 | 75.1 | INTEL Xeon X7560, 8 CORES/CHIP (2266 MHz,8x256 KB L2, 24 MB L3 |
| ☑ | DELL PRECISION R5400 3333 MHz XEON X5260 | 85.7 | INTEL Xeon X7560, 8 CORES/CHIP (2266 MHz,8x256 KB L2, 24 MB L3 |
| ☑ | DELL PRECISION R5400 3200 MHz XEON W5580 | 128.7 | INTEL Xeon X7560, 8 CORES/CHIP (2266 MHz,8x256 KB L2, 24 MB L3 |

|◁ ◁ | PAGE 1 OF 1121 ▷ ▷|      DISPLAYING 1 - 50 OF 5059

FIG. 3

LOAD BALANCING USING IMPROVED COMPONENT CAPACITY ESTIMATION

BACKGROUND

The disclosure relates generally to load balancing and more specifically to load balancing using improved component capacity estimation.

SUMMARY

According to one embodiment of the disclosure, a method includes receiving, at a load balancer for a plurality of computing components, a workload request. The method also includes accessing a database including a respective non-linear scalability model for each of the plurality of computing components. The method further includes determining a particular computing component from the plurality of computing components based on each respective non-linear scalability model. The method additionally includes scheduling the workload request for execution by the particular computing component.

Other features and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the features and advantages thereof, reference now is made to the following description taken in connection with the accompanying drawings.

FIG. 3 illustrates an example user interface listing a computer/component model library including a number of various computing components in accordance with a non-limiting embodiment of the present disclosure.

DETAILED DESCRIPTION

Figure 1:
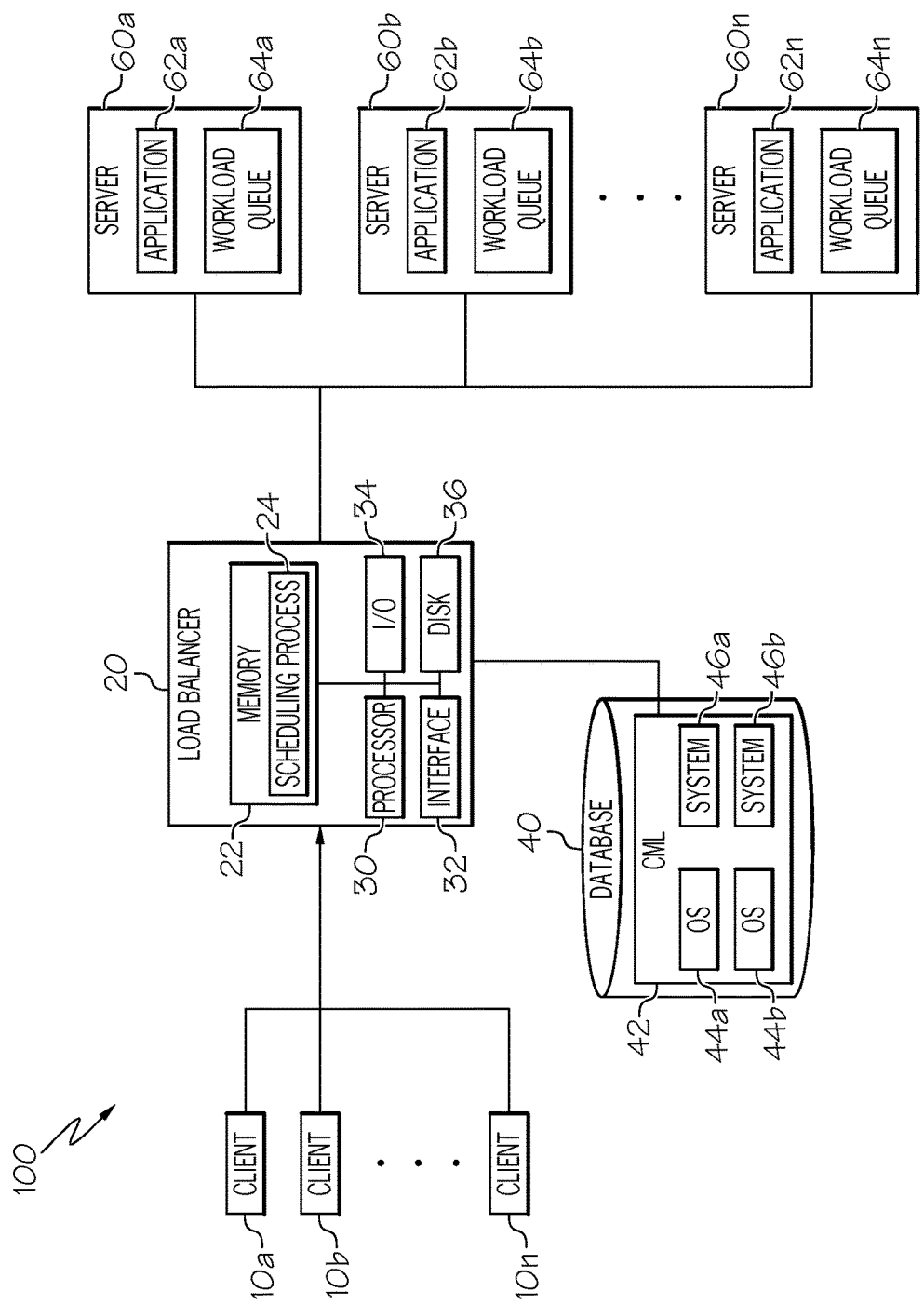
FIG. 1 illustrates a block diagram of a system for load balancing using improved capacity estimation in accordance with a non-limiting embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

As computer applications, products, and services become more complex and demand for those applications and services increases, the total available capacity of system resources decreases at a non-linear rate. For example, computing system capacity and consumption may be measured at a certain utilization rate for a fixed work-load. However, when additional jobs, loads, or requests are added to a system processing queue, the available capacity of the system may decrease at a non-linear rate. System performance may additionally decrease at a non-linear rate as additional jobs are scheduled. Thus, completing scheduled tasks may be delayed at a rate that is not linked to traditional system benchmarking or performance indicators.

For example, an application hosted on a single application server, regardless of how powerful or advanced the server is, may suffer performance lag in one or more of throughput, response time, and/or other performance metrics due to the effects of scaling on various system components. Some of these inefficiencies may be due to limited shared system resources. For example, system busses may communicate instructions from memory to processors for execution. System bus bandwidth may limit the routing of processor instructions in a multi-core or hyper-threaded system. In such a system, the processor capacity may be ample, but internal system communication components, such as system busses, may not have enough capacity to optimally coordinate execution of those instructions. Accordingly, while traditional system component capacity metrics, such as traditional CPU utilization techniques, may demonstrate a relatively low CPU utilization rate. However, actual CPU capacity utilization may be much greater.

Figure 6A:
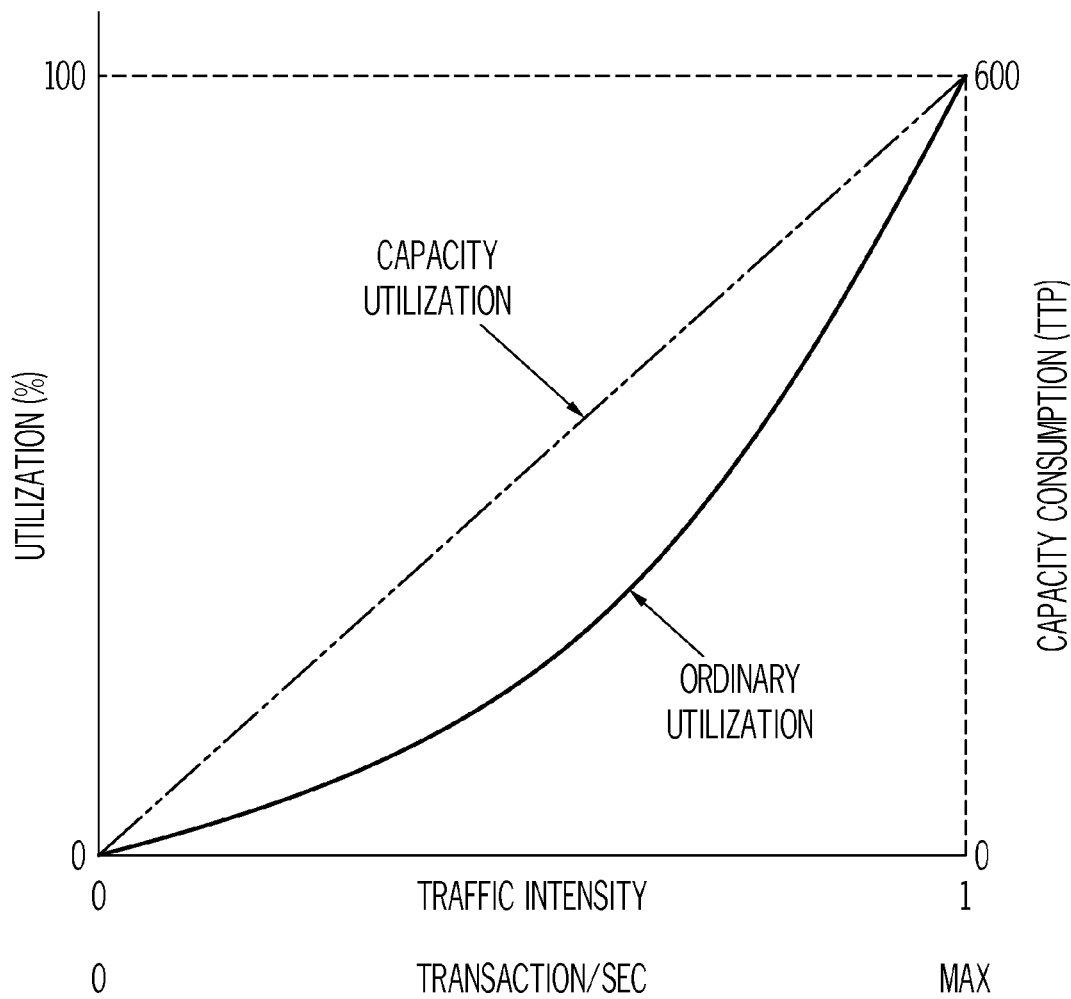
FIG. 6A illustrates an example graph showing capacity utilization, or true utilization, and ordinary utilization with respect to traffic intensity in accordance with a non-limiting embodiment of the present disclosure.
Figure 6B:
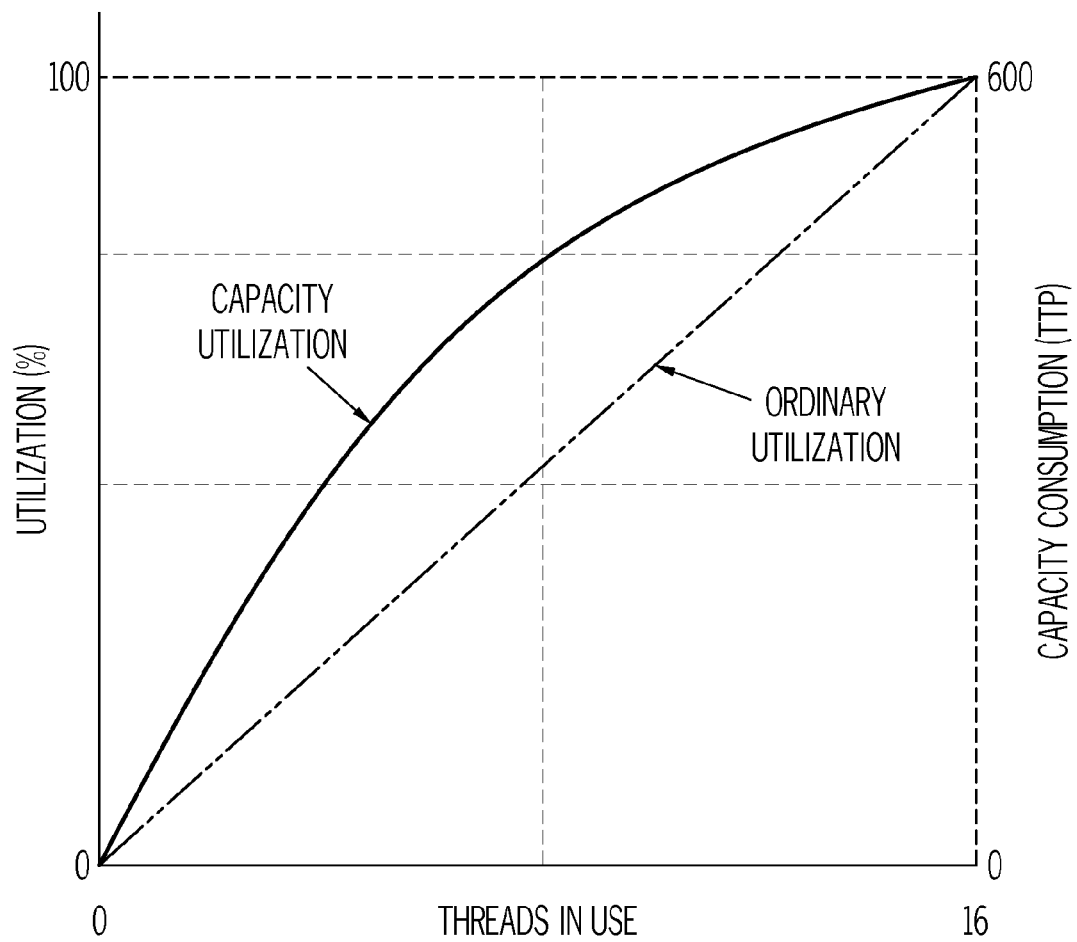
FIG. 6B illustrates an example graph showing capacity utilization, or true utilization, and ordinary utilization with respect to the number of threads in use in accordance with a non-limiting embodiment of the present disclosure.

For example, FIGS. 6A and 6B show the difference between capacity utilization, or true utilization, and ordinary utilization. Note, as the traffic intensity increases in FIG. 6A, ordinary resource consumption estimations tend to underestimate the true resource utilization that occurs. Similarly, as the number of threads executing increases as shown in FIG. 6B, ordinary resource consumption estimations tend to underestimate the true resource utilization that occurs.

Busses represent just one example component that may lead to under-estimation of resource capacity utilization using traditional techniques. Many other limited resources, such as communication ports, may also contribute to non-linear component scalability effects.

As yet another example, some resource bottlenecks may be due to increased operating system processor scheduling management processes. For example, certain operating systems may split particular threads into multiple threads to concurrently process non-dependent jobs from a single thread. However, coordination of system resources and thread jobs may utilize valuable system resources, especially during complex operations. Further, physical limitations such as latency from buffering data from disk or memory may cause non-linear delays in performance at scale.

Load balancing methods may help in part to distribute workloads across multiple computing resources to avoid overload of any single computing component. Load balancing methods may additionally increase the reliability of the system by distributing jobs to several components, eliminating a single point of failure. For example, if a single server processes all job requests, the failure of that single server may represent a single point of failure in the computing system.

However, load balancers may not model, predict, or schedule incoming jobs in a fashion that accounts for the non-linear scalability of individual computing components. For example, load balancers may schedule jobs based on traditional capacity and consumption performance metrics. But, as discussed throughout the present disclosure, such traditional capacity and consumption metrics may not accurately gauge real available capacity (headroom) or consumption of system resources.

Load balancers are commonly used in enterprise infrastructures. In certain embodiments, load balancers are used as front-end services that receive work requests. Load balancers may distribute requests to be handled by one or more of an array of backend services. A target server is selected to handle the work request based on a distribution policy. Different scheduling algorithms may be used as part of a distribution policy to distribute work requests to servers. Certain distribution policies may attempt to maximize a performance aspect of the serving infrastructure. For example, throughput of a particular job or utilization of a group of servers may be maximized by a particular distribution policy.

With reference to FIG. 1, a system 100 for load balancing using improved capacity estimation is illustrated in accordance with a particular non-limiting embodiment of the present disclosure. System 100 includes clients 10a-n, load balancer 20, database 40 with computer/component model library ("CML") 42, and servers 60a-n. Load balancer 20 includes memory 22, processor(s) 30, interface 32, I/O 34, and hard disk 36. Processor 30 reads instructions from hard disk 36 into memory 22 and executes processes, such as scheduling process 24. Database 40 includes CML 42 which in turn includes Operating System ("OS") component capacity utilization models 44a-b and system component capacity utilization models 46a-b. CML 42 may further contain virtual machine, appliance, container, virtualization software, or any other physical or virtual computing component models.

In certain embodiments, load balancer 20 receives work-load requests from clients 10*a-n* to execute work. For example, client 10*a* may request execution of a web application (e.g., application 62*a*), virtual machine instance, scheduled process, service, or other job. Scheduling process 24 may determine a normalized work-load request value. The normalized work-load request value may estimate the relative amount of work that the request may require. Scheduling process 24 may further retrieve CML non-linear scalability models corresponding to each server 60*a-n* configuration. Scheduling process 24 may map OS and system component models to servers to create component capacity utilization models. Scheduling process 24 may utilize the assembled model to determine a real utilization estimation, the capacity utilization, for each server 60*a-n*, and may schedule execution of requests based on the capacity utilization estimations. In certain embodiments, scheduling process 24 may utilize a distribution policy in scheduling execution of requests. For example, scheduling process 24 may schedule work-load requests for execution to balance capacity headroom among servers.

In certain embodiments, scheduling process 24 may determine that one or more servers are utilized at capacity, and may schedule new work-load requests based on a workload queue 64*a-n* at each server. For example, scheduling process 24 may estimate a normalized work-load queue capacity value. The work-load queue capacity value may estimate the relative amount of work that remains in the work-load queue of each server 60*a-n*. Scheduling processor 24 may take this work-load queue capacity value, a distribution policy, and/or any component capacity utilization models in scheduling incoming work-load requests.

Figure 2:
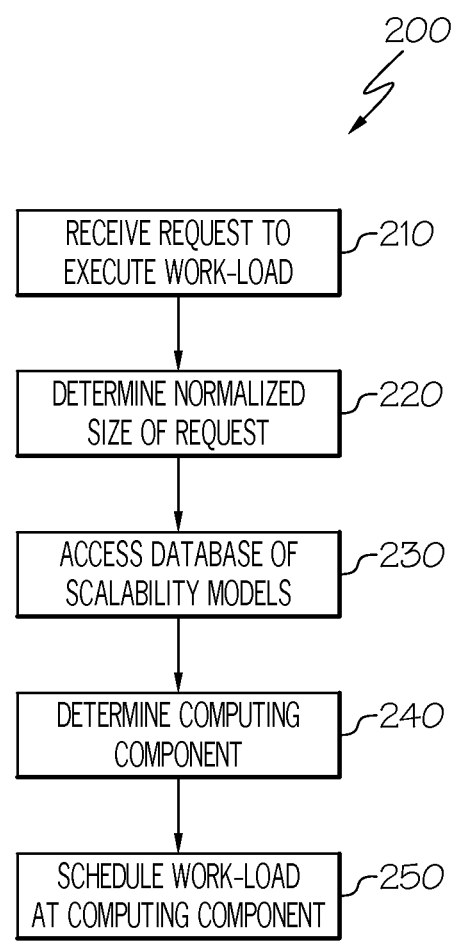
FIG. 2 illustrates a flow chart of a method for load balancing using improved capacity estimation in accordance with a non-limiting embodiment of the present disclosure.

With reference to FIG. 2, a flowchart 200 of a method for load balancing using improved capacity utilization is illustrated in accordance with a non-limiting embodiment of the present disclosure. At step 210, a request to execute a work-load at a target execution environment is received at a load balancer or other computing component that schedules execution of work-loads at one or more physical and/or virtual computing components.

At step 220, a normalized size of the work-load request is determined. For example, a scheduling process estimates the amount of CPU, memory, or other system component capacity that may be utilized to execute the received request. The estimation may be normalized with respect to the system component, operating system, and/or virtualization software on which the work is to be executed.

At step 230, a database of non-linear scalability models (e.g., CML 42 from FIG. 1) is accessed for each target server in the target execution environment. For example, a target execution environment (e.g., datacenter, server farm, virtualization environment, or the like) may contain a plurality of heterogeneous computing components. A scalability model for each computing component may be retrieved and/or assembled from a combination of scalability models corresponding to each component in each target server.

In one example, target server components are determined by an automated process. For example, an automated process may determine the type of computing components and software components in a particular server. Scalability models for each detected component may be selected from the database of scalability models. Each scalability model may provide a normalized model of capacity consumption and performance for each of a variety of metrics. For example, a scalability model may model CPU utilization, throughput, memory, and other system performance metrics. The models may be normalized with respect to the particular component that they each model. In certain embodiments, target server components may be entered manually and mapped to CML models manually.

At step 240, a computing component from the target execution environment is determined. The computing component may be determined based on the retrieved CML models. The determination may be performed such that one or more particular metrics are optimized. For example, the determination may be performed according to a distribution policy that maximizes CPU headroom among each server in the target execution environment. Those of ordinary skill in the art will understand the variety and complexity of system processes that may be optimized using the teachings of the present disclosure.

At step 250 the requested work-load is scheduled for execution at the selected computing component from step 240.

Distribution policies in the load balancers described in the present disclosure may be designed to achieve a variety of goals. In one example, a distribution policy places new job requests on the lightest loaded server. In this example, an incoming work request arrives at a load balancer. The load balancer determines which server, in a group or farm of servers, to assign the work request to. The load balancer may examine performance metrics of each server and may select a server based on the performance metrics. In this example, the load balancer may determine that ordinary utilization is a key performance metric for this particular goal. Thus, the load balancer may attempt to find the server with the lowest ordinary utilization rate and may schedule the work request on that server.

However, such a distribution policy may be flawed. Particularly, this policy may be flawed in heterogeneous environments, where servers in a server farm each have various operating system environments running on various hardware configurations. In such an environment, a performance metric, such as utilization, may not account for performance differences between servers or provide a true assessment of the available capacity of any individual server.

As another example, another distribution policy may place new job requests on servers to maximize utilization. Such a strategy may idealistically chosen to utilize a set of given resources, while reserving other resources for certain other tasks. For example, some cloud configurations may dynamically provision new resources as requested. However these resources may cost additional monetary resources. Thus, a strategy that maximizes utilization of existing (i.e., running, stood-up, or provisioned) servers, whether physical or virtual, may reduce hosting or infrastructure costs. In this example, an incoming work request is received at a load balancer. The incoming work request may have a known demand. For example, units of resource demand may be known about the request either before or when the request arrives. As another example, resource demand for the work request may be determined based on the request. The load balancer may analyze ordinary utilization of each server and may determine which of the "busiest" servers, (i.e., those with the highest ordinary utilization rates) can just barely accommodate the new work request. The work request may subsequently be assigned and/or passed to the determined server.

However, this distribution policy may also be flawed when executed in a heterogeneous server environment. For example, ordinary utilization may be a distortion of actual consumption on platforms that exhibit non-linear scaling effects. For example, certain hardware and software architectures may measure, read, and/or determine a certain processor or resource utilization percentage. However, as users, jobs, processes, and/or threads accumulate for execution on a server, utilization rates may not escalate linearly with the number, size, type, and/or complexity of each newly scheduled job. Thus, a load balancer using ordinary utilization metrics in conjunction with a distribution policy may schedule work on a server that has reached a practical maximum utilization rate, while the ordinary utilization metrics may indicate that excess processing capacity is available on the server.

In yet another example, load balancing policies may include an amount of utilization that must be available on the target server after and/or before scheduling the job for execution. Such a requirement may be called "headroom" or "required free capacity." Thus, no new work is scheduled on a server by the load balancer if the server is utilized such that free resource capacity, during execution of the instant process, would be smaller than the required headroom specified in the policy. In certain example, headroom is specified as a function of ordinary utilization.

However, these policy types are also flawed for at least the reasons discussed above with respect to ordinary utilization and the errors associated with the calculation, reliability, and scalability of ordinary utilization as a predictive metric.

Thus, a need has arisen for a load balancer, a load balancing scheduling policy, and/or load balancing techniques that utilize more accurate tracking, measuring, estimation and prediction of real capacity utilization in heterogeneous server-farm architectures. One aspect of the present disclosure may be to select a server, from a group of servers, with the highest available real capacity. One way a load balancer may perform this is to measure the true available capacity of each server. Another aspect of the present disclosure may be to accurately determine work request size. Further aspects of the present disclosure may be to convert the determined work request size into units of the true server capacity measurements. In accordance with the teachings of the present disclosure, the server that best fits the criteria of the scheduling policy may be selected.

In various embodiments, true available capacity may refer to the theoretical unloaded true capacity of the server, without factoring in true consumption of the server. For example, a capacity-consumption model for a central processing unit ("CPU") resource on a host includes a raw capacity computed in a set of portable units, such as total processing power ("TPP") for processing resources, for the host as a physical server with an ideal operating system and ideal processor. Generally, processor efficiency is less than ideal and raw capacity is reduced by a processor efficiency characterized by an exponential and/or linear degradation. For example, processor inefficiency may occur due to, for example, native operating system overhead, non-ideal scaling of processor efficiency, and/or core or thread contention for shared resources. Virtualization software, if running on a host, may consume processor threads as a function of the number of virtual machines and virtual CPU's that are configured. These and other similar processes further reduce the overall CPU capacity by a percentage of an ideal capacity.

Portable units may be defined as the speed independent service demand per unit time as used in U.S. Pat. No. 7,769,843, the disclosure of which is incorporated herein by reference. Portable units for CPU resources may be referred to herein as total processing power.

Real capacity calculations may require selecting a corresponding component model library model, or scalability model, an operating system scalability model, and optionally a virtual machine manager scalability model for each server, for example, in a server farm. Real consumption calculations may require ordinary utilization and other associated performance metrics.

In one example, a server may have 16 CPU's and may be working on many simultaneous or nearby transactions. For example, the server may process 80 transactions per second. At this rate of transactions, eight of the 16 CPU's may be utilized. Thus, 50% of the CPU's may be used at this transaction rate. In this same example, if the transaction rate is increased to 100 transactions per second, 100% of the CPU's may be utilized. Thus, even though there was merely a 25% increase in transactions, there was a 50% increase in CPU utilization. This may be due to, for example, multiple executing processors competing for shared resources such as caches, busses, and memory access.

Thus, in the above example, when half the CPU's are busy, the CPU capacity utilization is actually 80%, not 50%, because an increase of 25% from the current utilization (i.e., 20% increase from 80% current utilization) results in full utilization. Capacity thus measures how much work can be done, while capacity utilization measures how much of that capacity is consumed. One preferred measure of capacity and consumption is total processing power.

True capacity calculations may apply in both static and dynamic policy contexts. For example, a static policy uses historical measures of resource consumption and known server capacities to compute fixed assignment ratios that may be followed without real-time utilization or other measurements. For example, a schedule may be made based on historical utilization trends. The schedule may be adhered to regardless of real-time performance metrics during execution time.

As another example, a dynamic policy uses real-time performance metrics of ordinary utilization, capacity utilization, and/or response times to dynamically schedule work requests on available servers.

In certain embodiments, a dynamic policy implemented at a load balancer distributes transactions to the server with the largest currently available headroom according to capacity utilization. If no servers have any available headroom the load balancer may attempt to assign each transaction to the server with the smallest queue of waiting work relative to server capacity. For example, work in a queue may be estimated using total processing power, or some other platform independent processing metric. As another example, the queue of work may be measured in number of transactions. In certain embodiments, capacity headroom may be used here as a surrogate for response times. Balancing capacity headroom may tend to lower response times. However, a better response time calculation may not be possible in the general case, particularly in heterogeneous server environments including non-linear server architectures. Thus, the teachings of the present disclosure may balance capacity headroom in these heterogeneous environments.

In one embodiment, a load balancer may use the following process for distributing work requests to servers based on real capacity metrics. First a lower bound is estimated for the time required to complete all currently assigned CPU work. To accomplish this estimation, a lower bound is estimated for the time required to complete all the work assigned to a particular server. The derivative of that function is taken over a particular number of transactions. For example, D(t) represents an estimated service demand of transaction t. The units of D(t) may be total processing power-seconds (i.e., TPP-seconds) or real consumption-seconds. T(s) may represent the set of transactions located on server S. The executions may be either executing or pending on a particular server S. DD(s) may represent the sum of D(t) over all transactions in the set of transactions located on server S (i.e., D(s)). Thus, DD(s) may be the total service demand of all transactions located on server S.

For simplicity, other resources and other delays or constraints from inter-process communications may be ignored during this analysis. However, these delays may be accounted for during execution of the load balancer and policies that are the subject of the present disclosure.

In this example, C(s) may represent the capacity of server S. The units of C(s) may be total processing power-seconds or real consumption-seconds. The load balancer may estimate a value for L(s), where:

$$L(s) = \frac{DD(s)}{C(s)}$$

In other words, a lower bound on the time required to complete all the work located on a particular server S is the magnitude of that work in total processing power-seconds divided by the maximum rate in total processing power at which the server S can perform work. Using this example, the actual time to complete all assigned work may be greater than the computed L(s) because of a lack of transaction multi-threading and other factors that may be ignored in the above listed equation. Another reason the actual time to complete all assigned work may vary from that derived from the above described equation is that the processor configuration may not always be working at capacity.

Alternative dispatching rules may estimate the actual rate at which work is done, rather than assuming the maximum rate at capacity. For example, the current efficiency of work may be assumed to continue. However, this may only be true if work is constantly assigned at approximately the same rate as stale work is completed (another assumption for this to hold is that the server is capable of operating at approximately a steady state). Current efficiency may thus be estimated using the above describe binomial approximation algorithm to convert ordinary utilization to real capacity utilization.

The teachings of the present disclosure may apply a non-linear scalability model, which may also be used in the capacity modeling space, to a load balancer. For example, a portable, vendor-independent performance score may be a collection of platform independent calculations of that characterize the capacity of a system to provide resources to users of the system and characterize the consumption of those resources. A portable, vendor-independent performance score may be referred to as a resource score. In certain configurations, CPU resource score is a computed value of the capacity of a target system to deliver CPU computing power to applications, taking into account unique scalability characteristics of the host hardware, operating system, and virtualization environment. A resource score may include scores for other components within a system, such as memory, network, and storage I/O. Thus, reporting of aggregate computing capacity across individual—or groups of—hosts, virtual machines, or datacenters may be reported, managed, and modeled, thus advancing the overall understanding of performance management in enterprise IT infrastructures.

A more detailed description of portable, vendor-independent performance scores and modeling is contained in U.S. Patent Application Publication No. 2014/0019964 A1 and is incorporated herein by reference.

The various portable, vendor-independent performance scores, performance metrics, real utilization measurements, real capacity measurements, and the like, that are described in various embodiments of the present disclosure may be portable. In other words, resource scores may allow comparisons between heterogeneous hardware and software systems. For example, resource scores may permit a true comparison between true capacity of a legacy, aging system and a more modern system. This comparison may be made without regard to software components running on the systems.

Portable, vendor-independent performance scores may be used to model and/or predict performance of proposed system configurations. Such modeling may allow IT managers to more effectively plan hardware and software provisioning and procurement strategies to maximize desired performance metrics associated with those systems.

Portable, vendor-independent performance scores can be determined based on a corresponding component model for each particular hardware/software configuration. For example, component models may be generated for a set of hardware architectures, operating systems, and/or virtualization platforms. The component models may be associated with corresponding non-linear real capacity/consumption performance scalability models that evaluate, predict, and/or model system performance for a particular architecture. In certain embodiments, these models are predefined. In certain embodiments, these models may be generated by benchmarking, analyzing, and evaluating component performance until a realistic non-linear component performance model can be generated that realistically models performance of the component.

Component models may be grouped into a subset of models, e.g., a component model library. Various combinations of component models are selected to match a particular system configuration. In certain embodiments, this selection is automated. For example, a system may discover the various hardware and software components that make up a certain system configuration. In a data center, the system may discover each distinct hardware component architecture, including type of processors, number of processors, threads, cores, hyper-threading capabilities, memory capacity, busses, terminals, cache and other on-chip memory capacity, and the like.

The system may select a component model from the component model library that matches the discovered hardware architecture. In data center or other grouping of heterogeneous hardware components, each hardware component may have a corresponding model in the component model library. Similarly, the system may further discover various operating system and other software application components. For example, the system may discover a WINDOWS SERVER 2008™ operating system running on a particular hardware component. A corresponding component model library component model may be selected to match the hardware and operating system of the matching component. The system may additionally discover any virtualization software running on one or more particular servers. The system may additionally determine virtual system configurations, such as virtual provisioned system resources, operating systems, and the like. A corresponding component model may be selected for the virtualization platform, while also accounting for the underlying physical hardware and operating system architectures in any generated resource scores.

In addition to component models, a particular benchmark may be used to calculate a portable, platform and vendor independent resource score. In certain embodiments, the STANDARD PERFORMANCE EVALUATION CORPORATION™ ("SPEC") benchmark may be used. In certain configurations other benchmarking standards may be used.

In certain embodiments, the component library models may fill in missing pieces of the performance scores/estimations generated by a benchmark. For example, a benchmark may test system performance when the system is running at maximum load. Thus, component models may model performance of the component when system load is at various stages below maximum load capacity. Thus, the component benchmarking score may be just one piece in the overall determination of a portable, vendor-independent performance score.

A portable, vendor-independent performance score may be used to express one or more of capacity of a system to execute new work, jobs, loads, applications, and/or requests, and consumption of entities running on that system. Capacity may be determined using basic benchmarking performance information, the specific configuration information of a particular system, a component model of hardware scalability for the particular configuration and operating system and/or virtualization technology scalability model.

As work is deployed remaining available capacity, i.e., headroom, often declines at a non-linear scale. Additionally, operating system and virtual machine management overhead generally increases as more work is added to the system. Still further, the embedded operating system within a particular virtual machine contributes to overall consumption, which may be variable based on the underlying hardware architecture of the system or cluster. Accordingly, these variables and more may be accounted for within a portable, vendor-independent performance scores.

Using a portable, vendor-independent performance score enables comparisons of, for example, the capacity and consumption of different hosts or clusters, the capacity and consumption of business applications, the capacity and consumption of different business services, the headroom of different hosts or clusters, and/or the CPU consumption of different virtual machines running on different types of hosts.

With reference to FIG. 3, an example user interface listing a computer/component model library including a number of various computing components is illustrated in accordance with a non-limiting embodiment of the present disclosure. Various computer models are listed in one column with each corresponding CPU resource score listed in a second column. Resource scores may be briefly described above and may refer to a normalized vendor-independent performance score that estimates the capacity of a target system to deliver CPU computing power to applications while taking into account unique scalability characteristics of the host hardware, operating system, and/or virtualization environment. Thus, each resource score may account for the particular performance characteristics of each listed computer model.

Figure 4:
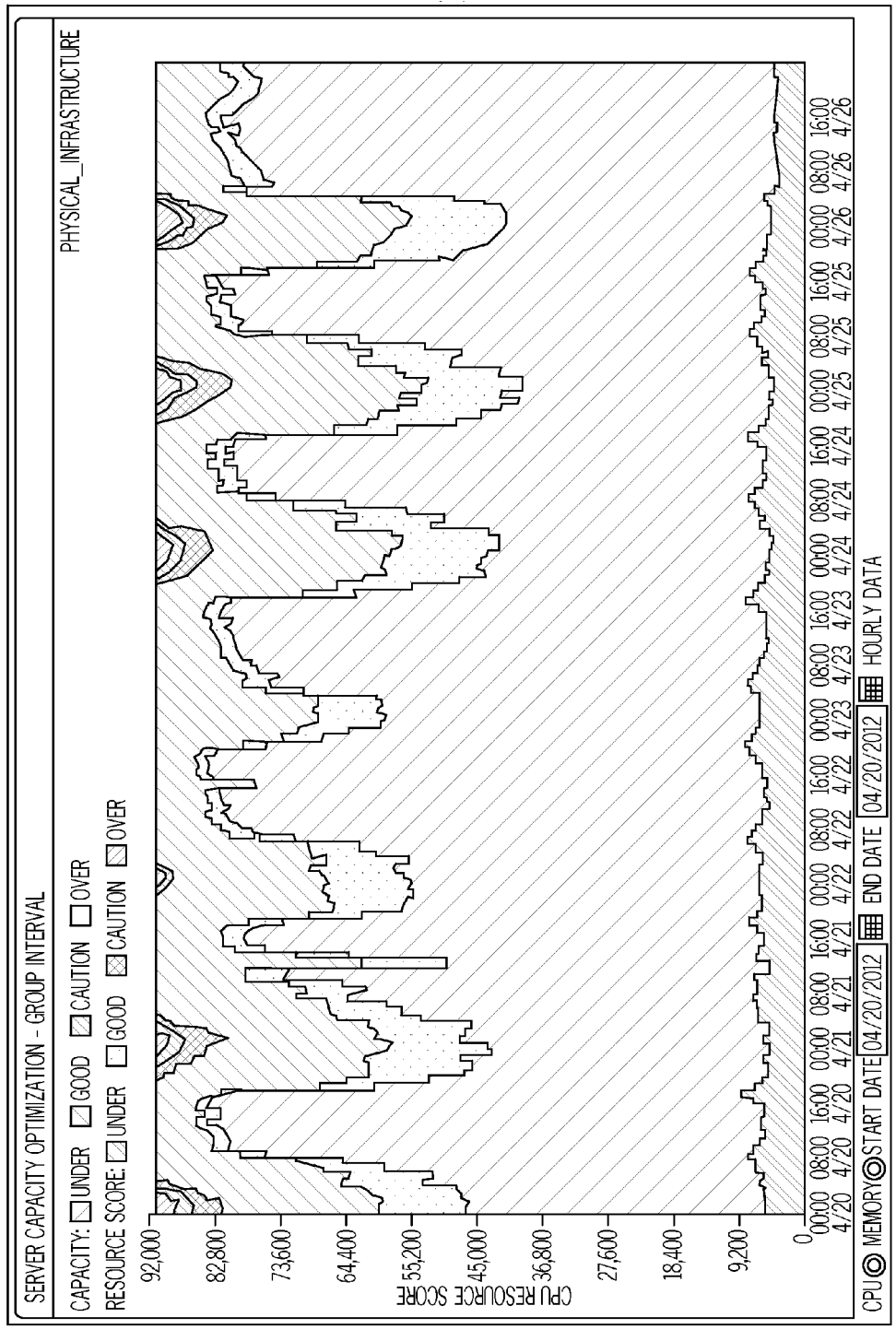
FIG. 4 illustrates an example user interface displaying CPU capacity utilization and/or usage patterns in a particular computing component in accordance with a non-limiting embodiment of the present disclosure.

With reference to FIG. 4, an example user interface displaying categorized CPU capacity utilization and/or usage patterns in a particular computing component is illustrated in accordance with a non-limiting embodiment of the present disclosure. Population of servers may be classified or categorized based on the capacity utilization into various categories for easier user comprehension. The capacity utilization and/or usage patterns may be illustrated with respect to time, thus allowing a system administrator to view the capacity utilization metrics for a particular server group. The illustrated graph may provide administrators with key insights into server, datacenter, server farm, etc. performance. For example, a system administrator may strive to keep utilization within a particular level in order to efficiently use all provisioned systems. Such utilization patterns may enable an organization to more effectively utilize resources to minimize energy costs, other server costs, cloud provider costs, and/or any other computing costs, while still providing an effective product or service to consumers of the services.

Figure 5:
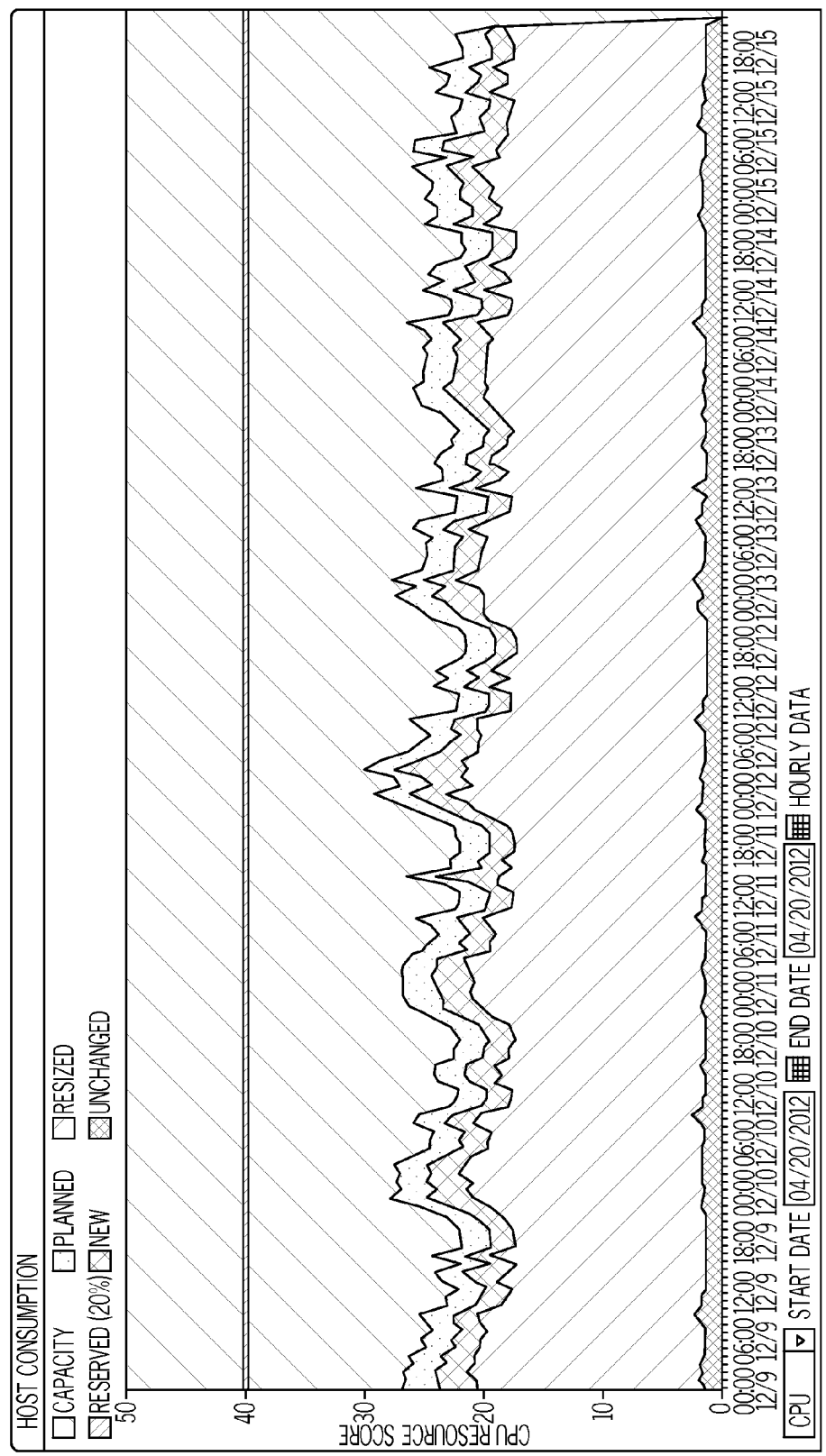
FIG. 5 illustrates an example user interface displaying CPU capacity utilization and/or usage patterns in a particular computing component in accordance with a non-limiting embodiment of the present disclosure.

With reference to FIG. 5, an example user interface displaying CPU capacity utilization and/or usage patterns in a particular computing component is illustrated in accordance with a non-limiting embodiment of the present disclosure. The illustrated graph may be useful in determining resource consumption for rates for a particular resource. For example, an administrator may navigate to this interface using a tree view data structure listing virtual machines in a particular virtualization environment. Future utilization patterns for the displayed virtual resource may be estimated based on past performance trends.

The load-balancers described in the present disclosure may utilize the models used to generate the interfaces displayed in FIGS. 4-5 to schedule workload request execution at a particular server based on current capacity and consumption at each server to optimize a particular metric according to a distribution policy.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
   receiving, at a load balancer for a plurality of computing components, a workload request;
   accessing a database comprising a respective non-linear scalability model for each of the plurality of computing components, wherein each non-linear scalability model models a plurality of different types of performance metrics for the computing component;
   determining a particular computing component to execute the workload request from the plurality of computing components based on each respective non-linear scalability model such that a particular metric specified in a distribution policy is optimized;
   scheduling the workload request for execution by the particular computing component; and
   determining a normalized estimated size of the workload request based on a plurality of possible computing components capable of executing the request and a plurality of system component capacities necessary to execute the workload request on the possible computing components, wherein determining the particular computing component is further based on the normalized estimated size of the workload request.

2. The method of claim 1, further comprising:
   determining a normalized estimated capacity of each of the plurality of computing components based on each respective non-linear scalability model, wherein determining the particular computing component is further based on each of the normalized estimated capacities.

3. The method of claim 2, wherein the particular computing component is determined so as to maximize the normalized estimated capacity of each of the plurality of computing components.

4. The method of claim 1, further comprising determining a workload completion rate for each of the plurality of computing components.

5. The method of claim 1, further comprising:
   determining an estimated workload request completion time for each of the plurality of computing components based on each respective non-linear scalability model and the normalized estimated size of the workload request, wherein determining the particular computing component is further based on each workload request completion time, and wherein the particular computing component is determined so as to minimize the estimated workload request completion time.

6. The method of claim 1, further comprising:
   determining an estimated workload queue completion time for each of the plurality of computing components based on:
      a respective plurality of jobs in a workload queue for each of the plurality of computing components, and
      each respective non-linear scalability model, wherein determining the particular computing component is further based on each estimated workload queue completion time.

7. The method of claim 4
   wherein the workload completion rate for each of the plurality of computing components are determined based on:
      a respective plurality of jobs in a workload queue for each of the plurality of computing components, and
      each respective non-linear scalability model, wherein determining the particular computing component is further based on each workload completion rate.

8. A computer configured to access a storage device, the computer comprising:
   a processor; and
   a non-transitory, computer-readable storage medium storing computer-readable instructions that when executed by the processor cause the computer to perform:
      receiving, at a load balancer for a plurality of computing components, a workload request;
      accessing a database comprising a respective non-linear scalability model for each of the plurality of computing components, wherein each non-linear scalability model models a plurality of different types of performance metrics for the computing component;
      determining a particular computing component to execute the workload request from the plurality of computing components based on each respective non-linear scalability model such that a particular metric specified in a distribution policy is optimized;
      scheduling the workload request for execution by the particular computing component; and
      determining a normalized estimated size of the workload request based on a plurality of possible computing components capable of executing the request and a plurality of system component capacities necessary to execute the workload request on the possible computing components, wherein determining the particular computing component is further based on the normalized estimated size of the workload request.

9. The computer of claim 8, wherein the computer-readable instructions further cause the computer to perform:
   determining a normalized estimated capacity of each of the plurality of computing components based on each respective non-linear scalability model, wherein determining the particular computing component is further based on each of the normalized estimated capacities.

10. The computer of claim 9, wherein the particular computing component is determined so as to maximize the normalized estimated capacity of each of the plurality of computing components.

11. The computer of claim 8, wherein the computer-readable instructions further cause the computer to perform determining a workload completion rate for each of the plurality of computing components.

12. The computer of claim 8, wherein the computer-readable instructions further cause the computer to perform:
   determining an estimated workload request completion time for each of the plurality of computing components based on each respective non-linear scalability model and the normalized estimated size of the workload request, wherein determining the particular computing component is further based on each workload request completion time, and wherein the particular computing component is determined so as to minimize the estimated workload request completion time.

13. The computer of claim 8, wherein the computer-readable instructions further cause the computer to perform:
determining an estimated workload queue completion time for each of the plurality of computing components based on:
a respective plurality of jobs in a workload queue for each of the plurality of computing components, and
each respective non-linear scalability model, wherein determining the particular computing component is further based on each estimated workload queue completion time.

14. The computer of claim 11, wherein the workload completion rate for each of the plurality of computing components are determined based on:
a respective plurality of jobs in a workload queue for each of the plurality of computing components, and
each respective non-linear scalability model, wherein determining the particular computing component is further based on each workload completion rate.

15. A computer program product comprising:
a non-transitory computer-readable storage medium having computer-readable program code embodied therewith, the computer-readable program code comprising:
computer-readable program code configured to receive, at a load balancer for a plurality of computing components, a workload request;
computer-readable program code configured to access a database comprising a respective non-linear scalability model for each of the plurality of computing components, wherein each non-linear scalability model models a plurality of different types of performance metrics for the computing component;
computer-readable program code configured to determine a particular computing component to execute the workload request from the plurality of computing components based on each respective non-linear scalability model such that a particular metric specified in a distribution policy is optimized;
computer-readable program code configured to schedule the workload request for execution by the particular computing component; and
computer-readable program code configured to determine a normalized estimated size of the workload request based on a plurality of possible computing components capable of executing the request and a plurality of system component capacities necessary to execute the workload request on the possible computing components, wherein determining the particular computing component is further based on the normalized estimated size of the workload request.

16. The computer program product of claim 15, wherein the computer-readable program code further comprises:
computer-readable program code configured to determine a normalized estimated capacity of each of the plurality of computing components based on each respective non-linear scalability model, wherein determining the particular computing component is further based on each of the normalized estimated capacities.

17. The computer program product of claim 16, wherein the particular computing component is determined so as to maximize the normalized estimated capacity of each of the plurality of computing components.

18. The computer program product of claim 15, wherein the computer-readable program code further comprises:
computer-readable program code configured to determine an estimated workload request completion time for each of the plurality of computing components based on each respective non-linear scalability model and the normalized estimated size of the workload request, wherein determining the particular computing component is further based on each workload request completion time, and wherein the particular computing component is determined so as to minimize the estimated workload request completion time.

19. The computer program product of claim 15, wherein the computer-readable program code further comprises:
computer-readable program code configured to determine an estimated workload queue completion time for each of the plurality of computing components based on:
a respective plurality of jobs in a workload queue for each of the plurality of computing components, and
each respective non-linear scalability model, wherein determining the particular computing component is further based on each estimated workload queue completion time.

* * * * *